April 5, 1927.
J. S. WIGHT
VAPORIZER
Filed Nov. 30, 1921
1,623,452
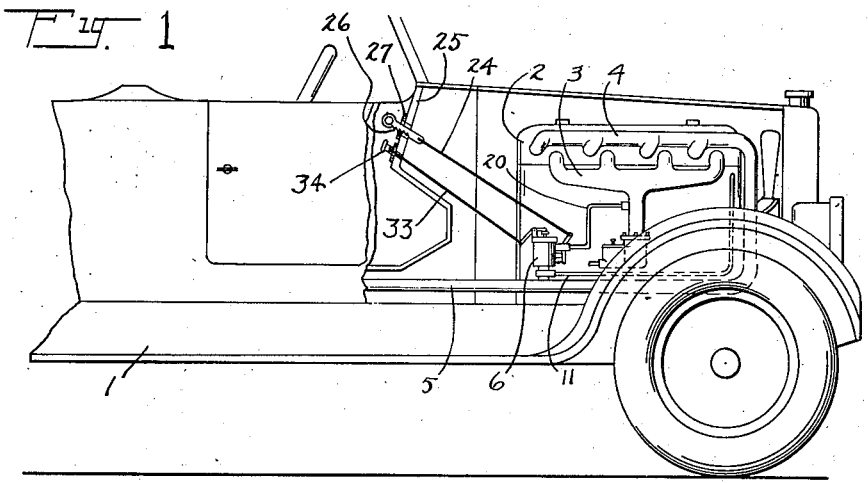
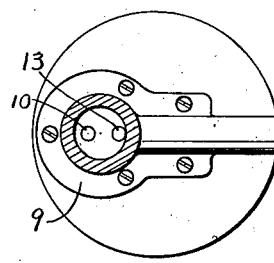
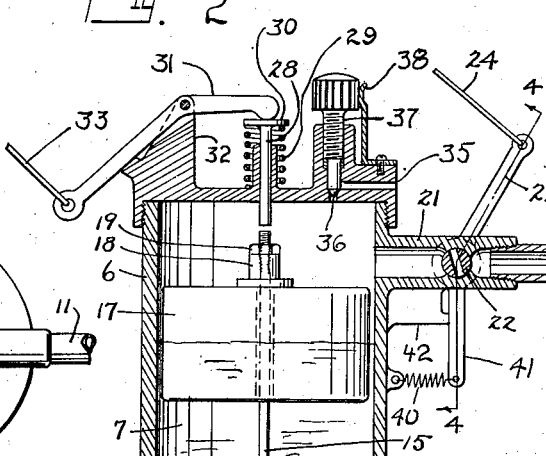
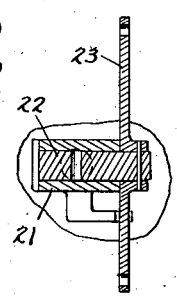
INVENTOR
Jarvis S. Wight,
BY
ATTORNEY Patented Apr. 5, 1927.

1,623,452

UNITED STATES PATENT OFFICE.

JARVIS SHERMAN WIGHT, OF BROOKLYN, NEW YORK.

VAPORIZER.

Application filed November 30, 1921. Serial No. 518,746.

This invention relates to vaporizers, and has particular reference to improvements in devices intended for supplying to a combustion engine with a fuel mixture, a quantity of water vapor for the purpose of improving the efficiency of the engine and reducing the formation of carbon.

The object of this invention is to provide a simple mechanism whereby under normal operating conditions a determined amount of vapor can be mixed with the fuel charge, and when it is desired to flush the cylinders and remove accumulated carbon, an increased amount of vapor and water can be supplied, both controllable from a distance.

In the accompanying drawings,

Figure 1 shows the invention applied to a motor vehicle engine of conventional form.

Figure 2 is a sectional elevation of the vaporizer.

Figure 3 is a transverse section taken on the line 3—3 of Figure 2, and

Figure 4 is a section taken on the line 4—4 of Figure 2.

Referring to the drawings, 1 denotes a motor vehicle, the power plant 2 thereof being an internal combustion engine of the usual type having intake manifold 3 and exhaust manifold 4 leading to exhaust pipe 5. Vaporizer 6 having an upper float chamber 7 and a lower heating chamber 8, is mounted by means of the screw threads 9 on exhaust pipe 5, the lower portion of heating chamber 8 extending well within pipe 5. Chambers 7 and 8 are connected by a passage 10. Water is supplied from any convenient source, as for instance, the cooling jackets of engine 2, through pipe 11 leading to valve chamber 12 of vaporizer 6. Valve chamber 12 communicates with the interior of vaporizer 6, preferably by means of a passage 13 leading into heating chamber 8, as shown, although if desired it may be connected to float chamber 7. Valve 14 on stem 15, cooperating with valve seat 16 in valve chamber 12, controls the passage of water through the latter. Float 17 in chamber 7 is secured to the upper portion of valve stem 15, the latter being threaded through nut 18 secured to float 17, thus providing for adjustment and permitting the level of the water to be altered as desired. Lock nut 19 maintains float 17 in any given position on valve stem 15.

Float chamber 7 is connected above the water level to intake manifold 3 by pipe 20 connected to outlet 21 of chamber 7. Valve 22, preferably of the rotary type and actuated by rocker arm 23, and having its passage of smaller diameter than the interior of outlet 21, is positioned in outlet 21, which is somewhat constricted at that point to provide a valve seat. Rod 24 is pivoted to the end of arm 23 and provides for actuating valve 22 from dashboard 25. The control end of rod 24 is provided with a notched or serrated slide 26, which engages slotted plate 27 on dashboard 25 to maintain valve 22 in any desired position.

In order to supply water in liquid form to the heated engine for removing accumulations of carbon it is necessary to flood reservoir 6. This is accomplished by depressing valve stem 15 through tappet rod 28 passing through the top of chamber 7 and normally held up and out of contact with valve stem 15 by helical compression spring 29, which surrounds valve stem 15 and is maintained between disc 30 on the upper end of the latter, and the top surface of the wall of chamber 7. Lever 31, pivoted to lug 32 on the top of chamber 7, engages disc 30, and is actuated to depress the latter by rod 33, to which it is pivoted and which terminates in control knob 34 positioned at the dashboard.

Air is admitted into chamber 7 through passage 35 in the upper portion thereof, the supply being controlled by valve 36, the stem 37 thereof being threaded into the wall of chamber 7 to provide for adjustment. Spring 38 engaging notches in the head of valve stem 37, maintains the latter in any given position.

The heat normally supplied from the exhaust will produce water vapor in chamber 7, and such vapor will be drawn into manifold 3 through pipe 20, valve 22, and outlet 21, the amount of air mixed therewith being relatively small and not ordinarily varied after being adjusted to the needs of the particular engine. It is desirable periodically to admit a larger quantity of water with the engine running heated, in order to prevent accumulations of carbon; this should also be done whenever any such accumulations have formed to reduce the same, such accumulations being partly due to carbon and partly to dust drawn in through the carbureter. By depressing tappet rod 28, chamber 7 floods and the water is drawn into pipe 20, being atomized upon passing through the constricted passage of valve 22, so that it is not drawn into the engine in drops, but in the form of spray or globules. If desired, pipe 20 may be heated, but this is not ordinarily necessary.

Spring 40 secured to arm 41 of valve 22 tends to hold said arm against stop lug 42 on reservoir 6, and in conjunction with the serrations of slide 26 maintains valve 22 in any given position.

This application is a continuation in part of my previous application Serial Number 380,788, filed May 12, 1920.

What I claim is:

1. A vaporizer for an internal combustion engine, comprising in combination, a water supply, an automatic valve controlling said water supply, an air supply, means for vaporizing the water and mixing the air with the water vapor, an outlet for supplying said mixture to the engine intake manifold, and means cooperating with said valve for supplying an excess of moisture from said vaporizer to said outlet in the form of globules or spray.

2. A vaporizer for an internal combustion engine, comprising in combination, a water reservoir, water and air supply thereto, means for vaporizing water from the reservoir, means for controlling the water level within said reservoir, an outlet above the normal water level for supplying a mixture of water vapor and air to the engine intake manifold, and means for flooding the reservoir with water above said outlet and supplying only water to said outlet from the vaporizer.

3. A vaporizer for a motor vehicle internal combustion engine comprising in combination, a water supply, a float valve controlling said water supply, an air supply, means for vaporizing the water and mixing air with the water vapor, an outlet from said means for supplying the mixture to the engine intake manifold, and means actuated from adjacent the driver's seat engaging said valve and opening the same for supplying an excess of moisture from said vaporizer to said engine.

4. The combination with a vaporizer having a vapor chamber, air and water inlets to said chamber, a pipe having a restricted portion leading from said chamber to the intake manifold of an internal combustion engine and located above the water level therein, means for heating the water to give off vapor in said chamber, a float valve means in said chamber, and means whereby said float valve means may be rendered inactive thereby producing at will either a vapor and air mixture or a water spray for use in said intake manifold.

5. A vaporizer for an internal combustion engine comprising in combination, a reservoir, water and air supply therefor, a heating chamber below the reservoir which is adapted to be inserted in the engine exhaust pipe for supplying water vapor to the reservoir, an outlet from the reservoir above the normal water level for supplying a mixture of water vapor and air to the engine intake manifold, a float within the reservoir for controlling the supply of water thereto, means for depressing the float and flooding the reservoir, and means in said outlet for breaking up water from the flooded reservoir into globules or spray.

Signed at Brooklyn, in the county of Kings and State of New York, this 26th day of November A. D. 1921.

JARVIS SHERMAN WIGHT.